United States Patent
Rollmann et al.

[15] 3,694,523
[45] Sept. 26, 1972

[54] DIAMINE SALTS OF DICARBOXYLIC ACIDS AS ADDITIVES FOR BLOCK POLYMERS

[72] Inventors: Kent W. Rollmann; Harold V. Wood, both of Bartlesville, Okla.

[73] Assignee: Phillips Petroleum Company

[22] Filed: Jan. 30, 1970

[21] Appl. No.: 7,211

[52] U.S. Cl. ............... 260/880 B, 260/857, 260/879, 260/887
[51] Int. Cl. ....... C08f 19/08, C08f 25/00, C08f 45/60
[58] Field of Search .................. 260/879, 880 B, 857

[56] References Cited

UNITED STATES PATENTS 3,326,880    6/1967    Binsbergen .............. 260/93.7
3,499,884    3/1970    Wood ...................... 260/94.9
3,367,926    2/1968    Voeks ...................... 260/93.5

Primary Examiner—James A. Seidleck
Attorney—Young & Quigg

[57] ABSTRACT

The tensile strength of radial or linear block copolymers containing terminal non-elastomeric blocks and central elastomeric blocks is improved by incorporating into the polymer at least one diamine salt of a dicarboxylic acid.

6 Claims, No Drawings

DIAMINE SALTS OF DICARBOXYLIC ACIDS AS ADDITIVES FOR BLOCK POLYMERS

This invention relates to a process for improving the green tensile strength of block polymers. This invention further relates to an improved polymer composition.

It has now been discovered that if primary diamine salts of aliphatic and alicyclic dicarboxylic acids are added to radial or linear block copolymers containing terminal non-elastomeric blocks and central elastomeric blocks that improvement in the green tensile strength of said polymers is provided.

It is surprising in itself that these additives, conveniently referred to as nylon-salts, would increase the tensile strength of the polymers employed according to this invention. The effect produced with these polymers is all the more startling in that other known nucleating agents for olefin polymers do not demonstrate similar effects when added to these radial and linear block polymers. The mechanism by which the additives of this invention function is not entirely understood.

Thus according to this invention, the salt, formed by the reaction of an organic primary diamine having from about six to 12 carbon atoms per molecule and an aliphatic or alicyclic dicarboxylic acid having from about six to 16 carbon atoms per molecule, is admixed with a radial or linear block polymer containing terminal non-elastomeric blocks and centrally located elastomeric blocks to provide improved green tensile strength to the block copolymer.

The block polymers to which the additives of this invention are admixed are those polymers conventionally referred to as linear or radial block copolymers wherein said block copolymers contain terminal non-elastomeric blocks and central elastomeric blocks.

The linear block polymers employed according to this invention can be broadly depicted as an A–B–A type polymer. These polymers are characterized by containing three joined segments, or blocks, wherein A represents a polymer segment having non-elastomeric properties and B represents an elastomeric polymer segment.

A segment of blocks of the linear block polymer are joined in an end-to-end arrangement through a primary chemical bond. Each polymeric segment can contain a sequence of monomeric units substantially of a single monomer and thus essentially comprise a homopolymer block or they can contain a randomly alternating sequence of two or more different monomers and thus form a random copolymer block. Thus, the elastomeric blocks or segments can be homopolymers of conjugated dienes, copolymers of two or more conjugated dienes, or copolymers of one or more conjugated dienes with one or more monovinyl-substituted aromatic hydrocarbons. The central elastomeric block of the linear block copolymer contains at least fifty percent by weight of polymerized conjugated dienes containing from about four to 12 carbon atoms per molecule with the remainder comprising one or more polymerized monovinyl-substituted aromatic hydrocarbon monomers containing from about eight to 20 carbon atoms per molecule. The central elastomeric segment of the linear block polymer comprises from about 20 to 80 percent by weight of the total block copolymer composition and thus the terminal non-elastomeric polymer blocks or segments comprise from about 80 to 20 percent by weight of the total block copolymer composition.

The non-elastomeric terminal segments of linear block copolymer comprise homopolymers of the above-mentioned monovinyl-substituted aromatic hydrocarbons, copolymers of two or more of said monovinyl-substituted aromatic hydrocarbons, homopolymers of lactones, copolymers of two or more lactones, or copolymers of said monovinyl-substituted aromatic hydrocarbons with conjugated dienes which contain at least 80 percent by weight of said monovinyl-substituted aromatic hydrocarbon based on the monomeric composition of said non-elastomeric terminal block. As hereinbefore stated, the terminal non-elastomeric polymer blocks comprise about 80 to 20 weight percent of the total polymer composition. Furthermore, each terminal non-elastomeric block must be at least 10 weight percent of the total polymer composition.

It is evident that the amount of polymer representing each polymer segment in relation to the whole linear block polymer can vary but is of sufficient amount to impart elastomeric or non-elastomeric properties to that particular polymer segment.

The linear block polymer which has been broadly characterized an an A–B–A type polymer can be also characterized as an A–B–Y–B–A type polymer, when the method of preparation of the linear block polymer includes the addition of a difunctional treating agent. As in the A–B–A type polymer the A in the A–B–Y–B–A type polymer represents non-elastomeric polymer blocks and the two B's collectively represent the middle elastomeric polymer block with Y being representative of an atom or group of atoms derived from a difunctional treating agent which contained two functional groups per molecule and which effects the coupling of two living A–B type block polymers to produce the linear block polymer containing the terminal non-elastomeric blocks and the middle elastomeric block.

The radial block polymers employed according to this invention can be in a broad sense depicted as an $(A-B)_x Y'$ type polymers wherein A represents non-elastomeric polymer blocks, or segments, and B represents elastomeric polymer segments. $Y'$ is an atom or group of atoms derived from a polyfunctional treating agent used in the formation of the radial polymers and $x$ is an integer of at least three and can be equal to the number of functional groups of said polyfunctional treating agent.

The radial block polymer can thus be characterized as having at least three polymer branches with each branch of the radial block polymer comprising terminal non-elastomeric segments. The branches of the radial block polymer contain a terminal non-elastomeric segment attached to an elastomeric polymer segment.

The non-elastomeric segments of the radial block polymer and the elastomeric segments of the radial block polymer comprise the same monomeric composition as hereinbefore described for said linear block copolymers. Thus the total B segments collectively represent the middle elastomeric polymer segment of the linear block copolymer. As in the linear block copolymer the radial block copolymer contains elastomeric segments which comprise from about 20–80 percent by weight of the total polymer composition and the terminal non-elastomeric blocks comprise about 80–20 weight percent of the total polymer composition. Accordingly, each terminal non-elastomeric block of the radial block copolymer comprises a homopolymer of the above-mentioned monovinyl-substituted aromatic hydrocarbons, copolymers of two or more said vinyl aromatic hydrocarbons, homopolymers of lactones, copolymers of two or more lactones or copolymers of said monovinyl-substituted aromatic hydrocarbon of conjugated dienes which contain at least 80 percent by weight of said monovinyl-substituted aromatic hydrocarbon based on the weight of said non-elastomeric segment. Generally, each non-elastomeric polymer segment of the radial block polymer comprises at least 5 weight percent of the total weight of the radial block polymer.

The radial and linear block polymers employed according to this invention can be prepared by conventional methods. Exemplary methods are disclosed in U.S. Pat. No. 3,281,383 issued to Zelinski et al Oct. 25, 1966; U.S. Pat. No. 3,287,333 issued to Zelinski Nov. 22, 1966; U.S. Pat. No. 3,251,905 issued to Zelinski May 17, 1966; and U.S. Patent application Ser. No. 883,986, filed Dec. 10, 1969, entitled LACTONE COPOLYMERS, by Floyd E. Naylor now U.S. Pat. No. 3,598,799 issued Aug. 10, 1971. This latter application describes a suitable method for preparing the copolymers of this invention when lactone monomers are employed according to the instant application. The aforementioned references are incorporated herein by reference thereto.

As hereinbefore mentioned, some of the monomers that can be employed to form the linear and radial block polymers according to this invention are conjugated dienes containing from about four to 12 carbon atoms per molecule; monovinyl-substituted aromatic hydrocarbons containing from about eight to 20 carbon atoms per molecule; and lactones corresponding to the following formula

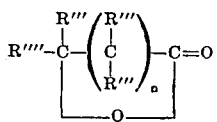

wherein R'''' is one of hydrogen and a radical of the formula

and when R'''' is a radical as specified no R''' is attached to the carbon atom to which the radical is attached, wherein R–' is one of hydrogen, alkyl, cycloalkyl, alkenyl, cycloalkenyl, aryl, and combinations thereof such as alkylaryl, wherein the total carbon atoms in the R''' and R'''' substituents being in the range of one to 12, and wherein $n$ being an integer which can be 1, 3, or 4.

Exemplary conjugated diene monomers are 1,3-butadiene; isoprene; 1,3-pentadiene; 2,3-dimethyl-1,3-butadiene; 2-ethyl-1,3-pentadiene; 1,3-hexadiene; 2-methyl-1,3-hexadiene; 1,3-octadiene; 2-methyl-1,3-undecadiene; 2-methyl-3-isopropyl-1,3-butadiene; and the like.

Exemplary monovinyl-substituted aromatic hydrocarbons are styrene; 3,5-diethylstryene; 4-n-propylstyrene; 4-cyclohexylstyrene; 4-phenylstyrene; 2,4,6-trimethylstyrene; 4-decylstyrene; 1-vinylnaphthalene; 8-phenyl-1-vinyl-napthalene; 8-phenyl-1-vinylnapthalene; 3-benzylstyrene; 3-(1-octyl)-1-vinylnaphthalene; and the like.

Suitable lactones include beta-propiolactone; delta-valerolactone; epsilon-caprolactone; and lactones corresponding to the following acids: 2-methyl-3-hydroxypropionic acid; 3-hydroxynonanoic or 3-hydroxypelargonic acid; 2-dodecyl-3-hydroxypropionic acid; 2-cyclopentyl-3-hydroxypropionic acid; 3-phenyl-3-hydroxypropionic acid; 2-methyl-5-hydroxyvaleric acid; 3-ethyl-5-isopropyl-6-hydroxycaprioc acid; 7-phenyl-6-hydroxy-6-octenoic acid; 2,2-di(1-cyclohexenyl)-5-hydroxy-5-heptenoic acid; 2,2-dimethyl-4-propenyl-3-hydroxy-3,5-heptadienoic acid; and the like.

As hereinbefore stated, a conventional method for forming the hereindescribed radial and linear block copolymers can be employed. The incremental addition of monomer method is the preferred method in preparing polymers employed in this invention. The incremental addition of monomer method can be employed by first forming a non-elastomeric block or segment of polymer by polymerizing a monomer or mixtures of monomers until substantially no initial monomers remain in the reaction mixture, adding a dissimilar monomer or mixtures of dissimilar monomers to the reaction medium in order to add to said non-elastomeric polymer block a block or segment of elastomeric polymer by continuing the polymerization.

Following the formation of the second elastomeric section, i.e., after substantially all of the monomer or mixtures of monomers have been polymerized, a terminal non-elastomeric polymer block can be formed by continuing the polymerization by charging additional monomer or monomers as before or a polyfunctional treating agent can be added to the polymerization mixture after the polymerization has been completed prior to inactivation of the polymerization initiator.

The functional treating agents that can be employed according to this invention in the preparation of the radial block polymers are the polyepoxides, polyimines, polyisocyanates, polyaldehydes, or polyhalides, described in U.S. Pat. No. 3,281,383 issued to Zelinski et al, Oct. 25, 1966, and the tin compounds disclosed in U.S. Pat. No. 3,393,182 issued to Trepka, July 16, 1968. As hereinbefore stated when preparing the radial polymers of this invention, the number of functional groups per molecule of said polyfunctional treating agent is at least three.

The polyfunctional treating agents that can be employed according to this invention in the preparation of linear block polymers are those compounds that correspond to the treating agents disclosed for radial block polymer formation except that said polyfunctional compounds contain only two functional groups per molecule instead of the at least three functional groups per molecule.

Accordingly, the diisocyanates, diamines, dialdehydes, dihalides, etc. can be employed as polyfunctional treating agents for preparing a linear block copolymer according to this invention.

Exemplary of polyfunctional treating agents having at least three functional groups are epoxidized vegetable oils such as epoxidized soybean oil, epoxidized linseed oil, 1,2,5,6,9,10-triepoxydecane; naphthalene-1,3,7-triisocyanate; tri(1-aziridinyl)phosphine oxide, tri(2-phenyl-1-aziridinyl)phosphine oxide; 1,6-hexandial-3-one; 1,3,5-tri(bromoethyl)benzene; 1,3-dichloro-2-propanone; tetravinyl tin; and the like.

Exemplary difunctional treating agents are benzene-1,4-diisocyanate, naphthalene-2,6-diisocyanate; di(2-phenyl-1-aziridinyl)propyl phosphine oxide; 1,4-naphthalene dicarboxyaldehyde; 1,5-pentanedial; dibromodibutylsilane; dicyclohexyldichlorotin; and the like.

Other suitable difunctional treating agents include carbon dioxide and the divinylaromatic compounds disclosed in U.S. Pat. No. 3,280,084, issued to Zelinski et al Oct. 18, 1966. Exemplary are 1,3-divinyl-benzene; 1,6-divinylnaphthalene; 4,4'-divinylbiphenyl; and the like.

Organoalkali metal initiator such as organolithium initiators are preferably employed in the preparation of polymers of this invention. Hydrocarbyllithium initiators, in particular alkyllithium initiators are especially preferred. The amount of initiator can vary over a broad range but will usually be in the range of about 0.1 to 10, preferably from about 1.0 to 4.0 gram millimoles per 100 grams of monomer employed in the polymerization process.

The polyfunctional treating agent, if employed, is added to the polymerization mixture after the polymerization has been completed but prior to inactivation of the initiator. The polyfunctional treating agent can be employed in an amount sufficient to provide from about 0.05 to 2, preferably .5 to 1.5 equivalents per gram atom of lithium employed in said initiator.

Polymerization conditions well known as suitable for the preparation of polymers using an organoalkali metal catalyst can be so employed according to this invention. Temperatures can vary over a broad range. Temperatures from —80° to 150° C, preferably from about 40° to 120° C are exemplary. The polymerization reaction can be conducted under autogeneous pressure. It is usually desirable to operate at pressures sufficient to maintain the monomeric material essentially in liquid phase.

The polymerization can be conducted in the presence or absence of a diluent. Inert hydrocarbon diluents selected from aromatics, paraffins, or cycloparaffins, and mixtures thereof, containing from about four to 10 carbon atoms can be suitably employed. The diluent or diluent mixture is one which is liquid under conditions of the polymerization process and exemplary diluents are isobutane, n-pentane, cyclohexane, benzene, toluene, xylene, naphthalene, and the like.

The polymers prepared according to this invention find utility in applications requiring high green tensile and good elongation properties. They can be used in applications wherein no curing or vulcanization is required, such as an injection molding of shoe soles, toys, or molded articles such as containers, pipe, and the like.

As hereinbefore stated, the additives of this invention are primary diamines salts of the aliphatic and alicyclic dicarboxylic acids. The general procedure for the formation of the additives of this invention is disclosed in U.S. Pat. application, Ser. No. 615,079, filed Feb. 10, 1967 by Harold D. Wood, entitled NUCLEATION OF 1-OLEFIN POLYMERS WITH NYLON SALTS, now U.S. Pat. No. 3,499,884, issued Mar. 10, 1970. Said reference is herein incorporated by reference thereto.

The primary diamines and the dicarboxylic acids employed according to this invention are generally combined in about a 1:1 mole ratio to produce the additives of this invention.

The diamines employed in preparing the salts of this invention can be represented by the general formula $R(NH_2)_2$ wherein R is an alkylene radical containing from about six to 12 carbon atoms. The organic dicarboxylic acids employed in the preparation of these salts can be represented by the formula $R'(CO_2H)_2$ wherein $R'$ is an alkylene or cycloalkylene radical containing from about six to 16 carbon atoms. The foregoing nylon salts can often be conveniently prepared by simply mixing together methyl alcohol solutions or suspensions of the diamine and the carboxylic acid. The salts which then precipitate can generally be recovered by simple filtration of this mixture. Exemplary salts of this invention include hexamethylene diammonium adipate (nylon 6–6 salt); hexamethylene diammonium sebacate(nylon 6–10 salt); hexamethylenediammonium 1,12-dodecandioate (nylon 6–12 salt); hexamethylene-diammonium 1,4-cyclohexanedicarboxylate; hexamethylenediammonium hexadecandioate; octamethylenediammonium 1,6-cyclododecandioate; dodecamethylene-diammonium adipate; decamethylenediammonium 1,10-decandioate; nonamethylene-diammonium 1,7-heptandioate; and the like.

The amount of salt additive employed according to this invention is generally from about 0.05 to 3, preferably 0.1 to 1 parts by weight of additive per 100 parts by weight of said polymer. The method of addition of the diamine salts of this invention to the polymers can be accomplished in any conventional manner known in the art. For example, at least one additive can be mixed with the polymer on a roll mill, in an internal mixer such as a Banbury mixer, or in a screw extruder, and the like.

The temperature at which the additive is admixed with the polymer can vary over a wide range, but it will be at least above the melting point or glass transition temperature of the resinous polymer blocks. Generally, the temperature employed will be from about 200° to 350° F. The time required in mixing the additive with the polymer can also vary over a wide range, but it will be at least sufficient to achieve essentially uniform dispersion of the additive throughout the polymer. Generally, the time will be from about 1 to 30 minutes. It should be noted that the temperature and time employed must not be so severe as to cause breakdown of the polymer during the mixing step.

The polymers containing the additives of this invention find utility in applications hereinbefore described for the polymers employed according to this invention. The polymers as stated have outstanding green tensile strength and good elongation properties.

Illustrative of the foregoing discussion and not to be interpreted as a limitation on the scope thereof, or on the materials herein employed, the following examples are presented.

EXAMPLE I

The effect of several additives on the properties of a sytrenelbutadiene/ε-caprolactone (25/50/25) block polymer was determined in the following runs. The additives tested were: lithium benzoate, a known olefin polymer nucleating agent; titanium dioxide, a known polymer reinforcing agent; and nylon 6–6 salt, an additive of this invention. A control run employing no additive was also made.

In each of these runs the additive was added to the polymer on a two-inch roll mill at 250° F. Each stock was mixed (cut and rolled) for 5 minutes after the additive was added then sheeted off the mill and molded at 307° F for 5 minutes between Teflon film. Specimens were then died from the molded sheet for determination of the tensile strength, 300 percent modulus, and elongation. Values shown are averages of three determinations for each stock.

The test polymer that was employed in these runs demonstrated the following properties: Mooney viscosity (MS-4 at 280° F) of 49; inherent viscosity of 1.51 dl/g; and a melt index at 180° C under 5 kg load of 2.40. The results are reported in Table I.

TABLE I

| Run No. | Name | php$^a$ | Tensile$^b$ Strength, psi | Modulus$^b$ 300%, psi | Elonga-$^b$ tion, % |
|---|---|---|---|---|---|
| 1 | lithium benzoate | 0.3 | 1360 | 750 | 730 |
| 2 | nylon 6-6 salt | do. | 1630 | 870 | 790 |
| 3 | Titanox RA-40$^c$ | do. | 1470 | 820 | 720 |
| 4 | none | — | 1410 | 760 | 730 |

$^a$php = parts per 100 parts of polymer
$^b$ASTM D-412-62T
$^c$Titanium dioxide supplied by Titanium Pigment Corporation.

The above results demonstrate that the additives of this invention (Run 2) give a large increase in tensile strength compared to the control (Rum 4) and also much higher tensile strength than that obtained with a known olefin polymer nucleating agent (Run 1) and a known polymer reinforcing agent (Run 3).

EXAMPLE II

Several runs were made to demonstrate the effectiveness of several different additives of this invention for improving the properties of the same polymer employed in Example I. Again, a control run employing no additive was made. Also, a run was made employing nylon 6–I salt (hexamethylene diammonium isophthalate) as an additive. The procedure in these runs was the same as that employed in Example I. The results are reported in Table II.

TABLE II

| Run No. | Name Additive | php | Tensile Strength psi$^a$ | Modulus 300%, psi$^a$ | Elonga- tion %$^a$ |
|---|---|---|---|---|---|
| 1 | nylon 6-I salt | 0.3 | 1420 | 840 | 680 |
| 2 | nylon 6-10 salt | do. | 1530 | 650 | 920 |
| 3 | nylon 6-12 salt | do. | 1780 | 760 | 930 |
| 4 | nylon 6-6 salt | do. | 1540 | 780 | 780 |
| 5 | none | — | 1460 | 790 | 740 |

$^a$As reported in Table I.

The above results again demonstrate that the additives of this invention provide a significant improvement in the tensile strength of the polymer when compared to the control containing no additive (Run 5) or to the polymer containing a diamine salt of an aromatic dicarboxylic acid (Run 1). Especially outstanding results were obtained with the nylon 6–12 salt (Run 3).

EXAMPLE III

A series of runs were made to demonstrate the effectiveness of varying levels of an additive of this invention in a styrene/butadiene/ε-caprolactone (20/20/60) block polymer. This polymer demonstrated the following properties: Mooney viscosity (MS-4 at 280° F) of 15; inherent viscosity of 1.90 dl/g and a melt index at 180° C under 5 kg load of 4.68. The results of these runs are given in Table III.

TABLE III

| Run No. | Nylon, 6-12 Salt, php | Tensile Strength, psi$^a$ | Elongation, %$^a$ |
|---|---|---|---|
| 1 | 0 | 2160 | 430 |
| 2 | 0.1 | 2510 | 470 |
| 3 | 0.3 | 2720 | 530 |
| 3 | 0.3 | 2720 | 530 |
| 4 | 1.0 | 2270 | 520 |

$^a$As reported in Table I.

The procedure employed in these runs was the same as that shown in Example I. These results show that the desired improvement in polymer properties can be obtained over a wide variation in additive level and further can be obtained at very low levels of additive (Run 2).

EXAMPLE IV

Other runs were made to demonstrate the effect of an additive of this invention on the properties of a styrene/butadiene/styrene (20/60/20) block polymer. This polymer demonstrated the following properties: Mooney viscosity (MS-4 at 270° F) of 71; inherent viscosity of 0.97 dl/g and melt index at 200° C under 5 kg load of 0.2. The results of these runs are shown in Table IV.

TABLE IV

| Run No. | Nylon 6-12 Salt, php | Tensile Strength, psi$^a$ | Elongation, psi$^a$ |
|---|---|---|---|
| 1 | 0 | 3230 | 2110 |
| 2 | 0.3 | 3820 | 2250 |

[a]As reported in Table I.

The procedure in these runs was the same as that employed in Example I.

The results in Table IV show that an additive of this invention provides an improvement in the properties of a styrene/butadiene/styrene block polymer.

EXAMPLE V

Other runs were made to demonstrate the effect of an additive of this invention on the properties of a radial block copolymer of butadiene/styrene (60/40). This polymer had the following properties: Mooney viscosity (MS-4 at 270° F) of 39; inherent viscosity of 0.88 dl/g; and a polystyrene content of 40.3 percent as determined by the procedure of I. M. Kolthoff, T. S. Lee, and C. W. Carr, J. Polymer Sci., 1, 429 (1946). This polymer was made according to the procedures of U.S. Pat. No. 3,281,383 of Zelinski et al employing Epoxol 9–5 as the polyfunctional terminating agent. In each of these runs the nylon salt was added to the polymer on a two-inch roll mill at about 240° F. Each stock was mixed for 3 minutes after the nylon salt was added then sheeted off the mill and molded at 307° F for 5 minutes between Teflon film. Values shown are averages of three determinations for each stock. The results of these runs are reported in Table V below.

TABLE V

| Run No. | Nylon Salt php | Tensile Strength, psi[c] | Modulus, 300%, psi[c] | Elongation, %[c] |
|---|---|---|---|---|
| 1 | — | 3980 | 900 | 1070 |
| 2 | 0.3[a] | 4310 | 950 | 1050 |
| 3 | 0.3[b] | 4300 | 980 | 1030 |

[a]Nylon 6–12 salt.
[b]Nylon 6–10 salt.
[c]As reported in Table I.

As will be evident to those skilled in the art, various modifications of this invention can be made or followed in light of the discussion and disclosure herein set forth without departing from the scope or the spirit thereof.

We claim:

1. A polymer composition having improved tensile strength comprising a mixture of linear or radial block polymers containing terminal non-elastomeric blocks and central elastomeric blocks wherein
   1. said terminal non-elastomeric blocks are
      a. homopolymers of a monovinyl-substituted aromatic hydrocarbon containing from about eight to 20 carbon atoms per molecule;
      b. copolymers of two or more of said monovinyl-substituted aromatic hydrocarbon
      c. homopolymers of lactones corresponding to the following formulas

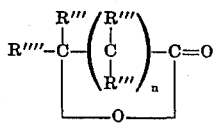

wherein R'''' is one of hydrogen and a radical of the formula

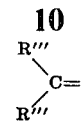

and when R'''' is a radical as specified no R''' is attached to the carbon atom to which the radical is attached, wherein R''' is one of hydrogen, alkyl, cycloalkyl, alkenyl, cycloalkenyl, or aryl, and combinations thereof, wherein the total carbon atoms in the R''' and R'''' substitutents being in the range of about one to 12, and wherein n being an integer which can be 1,3, or 4;
      d. copolymers of two or more lactones; or
      e. copolymers of said monovinyl-substituted aromatic hydrocarbon with conjugated dienes which contain at least 80 percent by weight of said monovinyl-substituted aromatic hydrocarbon based on the weight of said non-elastomeric polymer block; and
   2. said elastomeric block is
      a. a homopolymer of a conjugated diene containing from about four to 12 carbon atoms per molecule,
      b. a copolymer of two or more conjugated dienes, or
      c. a copolymer of one or more conjugated dienes with one or more monovinyl-substituted aromatic hydrocarbon monomers which contain at least 50 percent by weight of said diene based on the weight of said elastomeric block; wherein said terminal non-elastomeric blocks comprise from about 20 to 80 percent by weight of the total polymer composition and said elastomeric block comprises from about 80 to 20 percent by weight of the total polymer composition, and wherein each terminal block of said linear block polymer comprises at least 10 weight percent of the total polymer composition; and wherein each of said non-elastomeric polymer block of said radial block polymer comprises at least 5 weight percent of the total polymer composition, and at least one additive in the amount to provide from about 0.5 to 3 parts by weight of said additive per 100 parts by weight of said linear or radial block polymers, wherein said at least one additive is the salt formed by reacting a primary diamine corresponding to the general formula R(NH$_2$)$_2$, wherein R is an alkylene radical containing from about six to 12 carbon atoms, and a dicarboxylic acid that can be represented by the general formula R'(CO$_2$H)$_2$, wherein R' is an alkylene or cycloalkylene radical containing from about six to 16 carbon atoms.

2. The composition of claim 1 wherein said additive is selected from hexamethylene diammonium adipate, hexamethylene diammonium sebacate or hexamethylene diammonium 1,12-dodecanoate; and wherein said polymer is a linear block copolymer.

3. The composition of claim 2 wherein said linear block copolymer consists essentially of polymerized monomers selected from styrene and 1,3-butadiene.

4. The composition of claim 1 wherein said block polymer is comprised of polymerized monomers selected from styrene, 1,3-butadiene, and epsilon-caprolactone.

5. The composition of claim 1 wherein said additive is selected from hexamethylene diammonium adipate, hexamethylene diammonium sebacate or hexamethylene diammonium 1,12-dodecanoate; and wherein said polymer is a radial block copolymer consisting essentially of polymerized 1,3-butadiene and styrene.

6. The composition of claim 1 wherein said at least one additive is employed in an amount to provide from about 0.1 to 1 parts by weight of said at least one additive per 100 parts by weight of said polymer.

* * * * *

UNITED STATES PATENT OFFICE

CERTIFICATE OF CORRECTION

Patent No. 3,694,523                                    Dated: September 26, 1972

Kent W. Rollmann; Harold V. Wood

It is certified that error appears in the above-identified patent and that said Letters Patent are hereby corrected as shown below:

Column 10, line 43, after "tion," a paragraph should be inserted; line 44, delet "0.5" and insert --- .05 ---.

Signed and sealed this 29th day of May 1973.

(SEAL)
Attest:

EDWARD M. FLETCHER, JR.                        ROBERT GOTTSCHALK
Attesting Officer                                  Commissioner of Patents